United States Patent [19]
DeWitt et al.

[11] Patent Number: 5,217,261
[45] Date of Patent: Jun. 8, 1993

[54] FLARELESS COMPRESSION FITTING

[75] Inventors: Paul R. DeWitt, Van Wert; Steven C. Flickinger, Convoy, both of Ohio; Dennis J. Stuerzenberger, Monroeville, Ind.

[73] Assignee: Aeroquip Corporation, Jackson, Mich.

[21] Appl. No.: 513,383

[22] Filed: Apr. 23, 1990

[51] Int. Cl.⁵ .............................................. F16L 35/00
[52] U.S. Cl. .................... 285/332.2; 285/341; 285/382.7; 285/910; 29/520
[58] Field of Search ............... 285/382.7, 334.4, 332.2, 285/323, 342, 328, 309, 341, 910, 918, 93; 29/515, 520

[56] References Cited

U.S. PATENT DOCUMENTS

| | | | |
|---|---|---|---|
| 2,150,042 | 3/1936 | Shultz | 285/341 |
| 2,463,707 | 3/1949 | Matousek | 285/393 X |
| 2,523,135 | 9/1950 | Mercier | 285/342 |
| 2,687,315 | 8/1954 | Courtot | 285/331 |
| 2,737,403 | 3/1956 | Ellis | 285/342 X |
| 2,807,481 | 9/1957 | Main | 285/382.7 X |
| 3,265,412 | 8/1966 | Reid et al. | 285/342 X |
| 4,076,286 | 2/1978 | Spontelli | 285/382.7 X |
| 4,230,349 | 10/1980 | Normark | 285/342 |
| 4,529,231 | 7/1985 | Greenawalt | 285/342 |
| 4,556,242 | 12/1985 | Kowal et al. | 285/382.7 X |

FOREIGN PATENT DOCUMENTS

| | | | |
|---|---|---|---|
| 0691001 | 5/1940 | Fed. Rep. of Germany | 285/341 |
| 1253530 | 11/1967 | Fed. Rep. of Germany | 285/341 |
| 0151559 | 11/1937 | Switzerland | 285/342 |

Primary Examiner—Dave W. Arola
Assistant Examiner—Heather Chun

[57] ABSTRACT

A tube connector for sealing a flareless tube to a fitting having a flat sealing face perpendicular to the fitting axis. The tube connector incorporates a ferrule engaged by a sleeve mounted on the end of the tube and having a flat radial surface for engaging the fitting sealing face. The ferrule is deformable and establishes a primary wedge type metal-to-metal sealing engagement with the tube by a compression nut threaded upon the fitting. The ferrule radially bows under axial and radial compression and this deformation suppresses vibration while the shape of the ferrule end engaged by the nut increases the radial forces on the ferrule as the nut is tightened to provide firm tube support remote from the seal region. The sleeve is provided with an internal undercut adapted to outwardly flare the end of the tube to lock the tube to the sleeve, and radially support the tube end as the tube is compressed during connection.

9 Claims, 3 Drawing Sheets

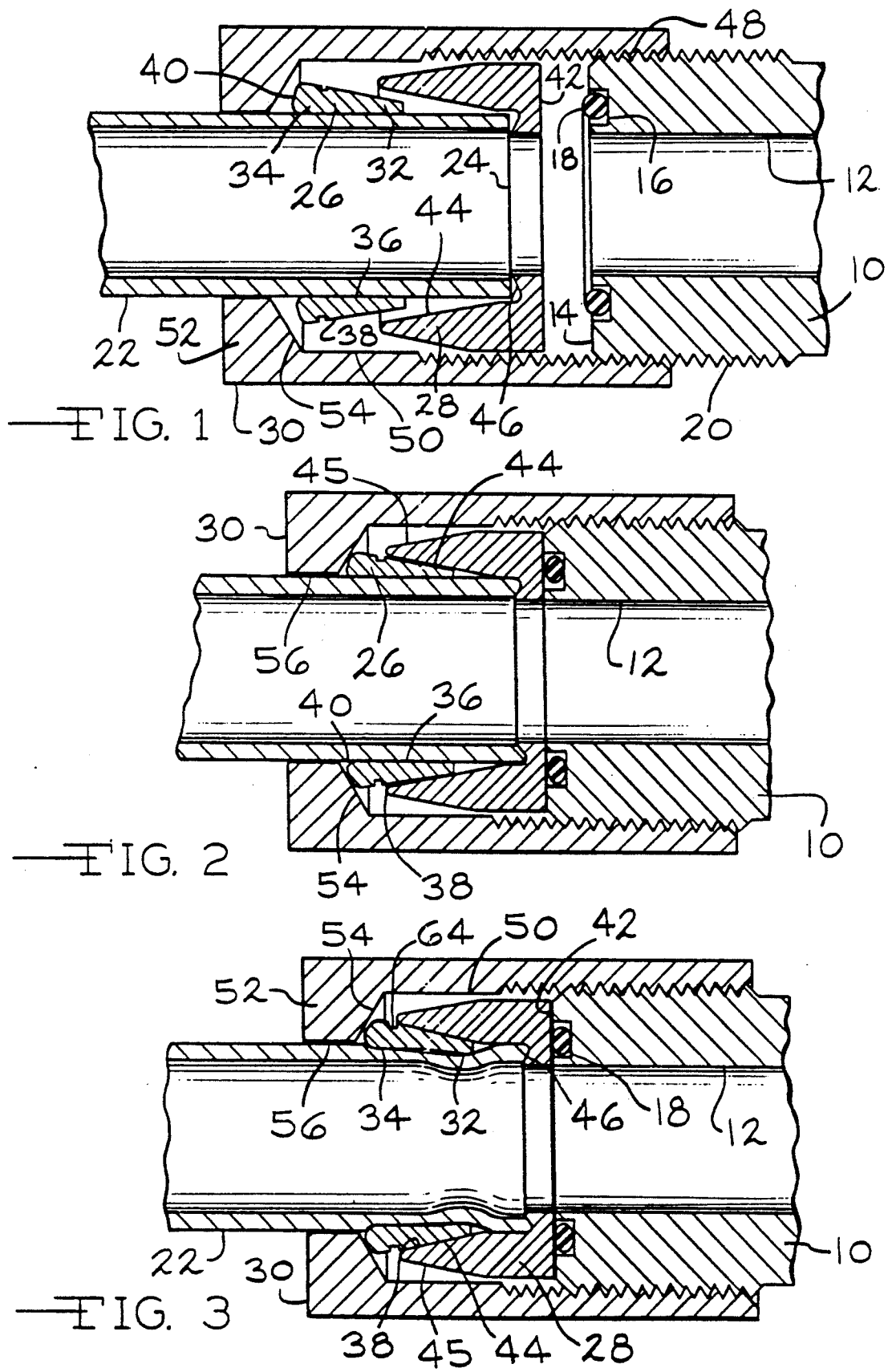

FLARELESS COMPRESSION FITTING

BACKGROUND OF THE INVENTION

Flareless tubes are commonly connected to a tubular fitting body by a nut and ferrule type tube connector assembly wherein a ferrule is placed over the end of a tube, and the ferrule is provided with a sealing face having a configuration adapted to conform to a sealing face defined upon the fitting body to establish a sealing relationship therewith. Often, the ferrule is provided with a deformable portion having an internal edge or serrations adapted to be deformed inwardly into engagement with the associated tube by tightening of a compression nut on the fitting body so as to produce a metal-to-metal sealing relationship with the tube and prevent the tube from axially separating from the fitting such as shown in U.S. Pat. No. 3,109,673 and the assignees U.S. Pat. No. 4,529,231.

Tube connectors of the flareless types are often employed with tubes formed of various materials and hardness, and as the sealing and axial force resistance between the tube and tube connector is dependent upon the engagement of the ferrule with the tube, when connecting tubes of relatively hard materials or nonuniform surfaces, a fluid tight assembly is not always obtained. Even if a fluid tight assembly is initially established, leakage may occur during normal operation due to tubing vibration and deflection if the primary engagement between the ferrule and tube is located adjacent the primary sealing region. Some tube connectors have utilized constructions which have improved the overall performance of the connector, but the results are still less than satisfactory and often the constructions require expensive manufacturing processes.

In U.S. Pat. No. 2,523,135 a tube connector is shown utilizing a double ferrule arrangement wherein one of the ferrules is deformed into a wedge type metal-to-metal sealing engagement with the associated tube. This wedge type of engagement has an advantage over tube connectors employing ferrules which utilize a cutting edge or serrations because a larger contact area is created between the tube and ferrule which produces a more effective seal and provides frictional forces capable of establishing an effective grip on the tube. The outer ferrule has a conical sealing face which establishes a sealing engagement with a conical sealing face defined on the fitting body, and this requires time consuming and expensive machining processes. Also, the end of the tube is not received in a supportive relationship with the ferrule which would provide additional vibration resistance.

In U.S. Pat. No. 2,737,403 a double ferrule arrangement is utilized wherein the end of the tube is received in a sealing engagement with a circumferential undercut defined in one of the ferrules while the other ferrule establishes a sealing engagement with the outer surface of the tube so as to provide a double seal. The undercut portion flares the end of the tube outwardly to create a seal against the ferrule. However, the ferrule which engages the tube outer surface and the nut utilize a perpendicular contact relationship which does not resist vibration loading, and the construction includes abutment shoulders defined on the ferrule and nut which engage to limit nut tightening so if leakage occurs during operation further tightening cannot be accomplished to stop the leakage. Also, the sealing face of the ferrule which engages the fitting body sealing face is of a conical configuration and this requires accurate machining which would not be necessary if the sealing faces were flat.

It is an object of the invention to provide a tube connector of the nut and ferrule type for connecting a flareless tube to a fitting body having a flat sealing face wherein the tube connector is relatively inexpensive to manufacture, simple and efficient to use, dependable in operation, and is capable of being utilized with a wide range of tubing materials of various hardness.

Another object of the invention is to provide a tube connector which utilizes a ferrule and sleeve arrangement wherein the sleeve is provided internally with a circumferential undercut for outwardly flaring the end of the tube and establishing a supporting and locking relationship therewith while the ferrule establishes a wedge type metal-to-metal sealing engagement with the outer surface of the tube so as to provide a double seal.

Yet another object of the invention is to provide a tube connector which utilizes a ferrule and sleeve arrangement operable by a compression nut wherein the sleeve is mounted upon the end of the tube and the ferrule includes front and rear portions, the nut having an internal cam surface adapted to force the ferrule axially forwardly into engagement with the sleeve deforming the front portion into a metal-to-metal sealing engagement with the tube as well as to deform the ferrule into a bowed configuration and its rear portion radially inwardly into the tube to assist in vibration dampening.

An additional object of the invention is to provide a tube connector which utilizes a ferrule, sleeve and compression nut arrangement wherein the construction of the connector does not include means for limiting tightening of the nut and the nut may be sufficiently tightened to establish a double seal between the connector and associated tube to provide a fluid tight assembly.

A further object of the invention is to provide a flareless tube connector employing a sleeve and ferrule wherein a cam surface defined on the sleeve compresses and contracts the ferrule upon the tube, and the sleeve is of such configuration as to permit limited sleeve expansion and radial deformation during ferrule compression to provide a radial biasing pressure on the ferrule.

In the practice of the invention, a fitting body includes a flat radial face having an annular recess defined thereon receiving an elastomeric "O" ring having a greater normal axial dimension than the depth of the recess. The fitting body is externally threaded adjacent its end, and the fitting body may be soldered or threaded upon a tube or other conduit system connection, or otherwise permanently affixed to the conduit system.

A sleeve placed upon the end of a metal tube includes an internal undercut portion adapted to receive and outwardly flange the end of the tube, and the sleeve includes a flat radial surface for engaging the fitting body sealing face and the "O" ring. The sleeve also includes an inner annular conical cam surface adapted to overlie and engage a ferrule and a tapered outer surface to provide clearance for radial expansion. The sleeve includes a cantilevered end which is radially deformed outwardly as the ferrule is compressed which maintains a radial biasing force on the ferrule.

The ferrule is provided with an inner diameter slightly greater than the diameter of the tube, and includes a rear portion and a front portion extending toward the fitting body. A tapered outer surface defined on ferrule is adapted to engage the differently angled sleeve cam surface to deform the front portion of the ferrule into a wedge type metal-to-metal sealing engagement with the tube by a compression nut threaded on the fitting body. The tapered surface of the ferrule is of significantly lesser angle than the sleeve's inner cam surface, causing the ferrule to bow inwardly during assembly. This bowing action creates a compression force within the fitting that absorbs vibration and causes the ferrule to firmly support the tube at a location which is remote from the location of the primary sealing. The nut includes an internal annular conical cam surface which engages a convex abutment surface defined on the ferrule adjacent the rear portion of the ferrule upon rotation of the nut in the tightening direction to force the ferrule axially forwardly and radially inwardly, and engage the ferrule outer surface and sleeve cam surface. This wedge type engagement jams the end of the tube axially forwardly into the sleeve undercut portion flaring the end of the tube outwardly and establishing a locked connection between the tube and sleeve preventing collapse of the tube end. The internal cam surface of the nut also forces the rear portion of the ferrule inwardly into the tube to bow the ferrule which assists in vibration dampening and forces the ferrule rear end into firm contact with the tube for support of the tube at an axial location remote from the ferrule front end where primary sealing is occurring making the connector less susceptible to leakage during operation.

Because the construction utilizes a wedge type sealing engagement with the tube, the tube connector is capable of being employed with a wide range of tubing materials of various hardness.

BRIEF DESCRIPTION OF THE DRAWINGS

The aforementioned objects and advantages of the invention will be appreciated from the following description and accompanying drawings wherein:

FIG. 1 is an elevational view, diametrically sectioned, illustrating a flat-face seal tube connector in accord with the invention after initial assembly, but prior to tightening of the compression nut, FIG. 2 is a view similar to that of FIG. 1 illustrating the relationship of the components after rotation of the nut toward the fully assembled position, and FIG. 3 is an elevational sectional view similar to FIGS. 1 and 2 illustrating the connector in its fully assembled position.

DESCRIPTION OF THE PREFERRED EMBODIMENT

Figure 4:
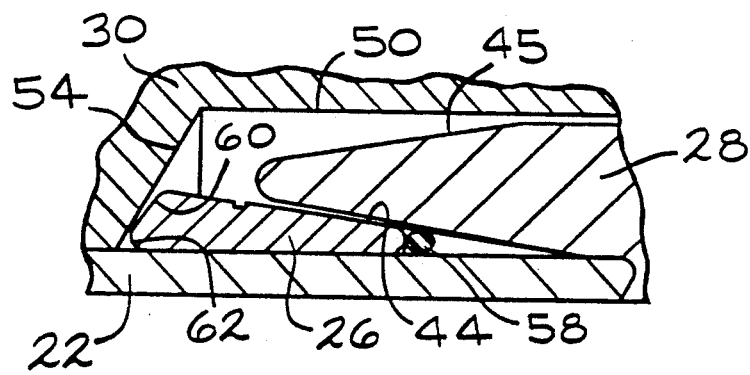
FIG. 4 is an enlarged sectional detail view of the sleeve end, ferrule and nut cam surface illustrating the relationship of FIG. 2 prior to compression and axially displacement of the ferrule and illustrating the use of an optional seal ring between the sleeve and tube.

The components of the invention will be appreciated from the drawing figures. The basic component is the annular fitting body 10, partially shown, which is axially bored at 12. The bore 12 intersects an outer end 14 which is planar in configuration and is perpendicularly related to the axis of the fitting body. An annular recess 16 is concentrically defined within the end 14 and receives an elastomeric "O" ring 18 of a normal diameter greater than the axial depth of the recess 16 wherein upon assembly of the "O" ring into the recess a portion of the ring will axially extend beyond the plane of the fitting body end 14. The fitting 10 is provided with external threads at 20 adjacent the end 14, and the other end of the fitting, not shown, is adapted to receive a conduit having a bore in coaxial communication with the bore 12.

A tube 22 is to be connected to the fitting body 10, and the tube is of a cylindrical configuration including a squared end 24. A deformable ferrule 26 is mounted over the end of the tube 24, and an annular sleeve 28 is mounted upon the tube end. A nut 30 is placed over the tube end prior to the assembly of the ferrule and sleeve thereon.

The ferrule 26 is of an annular form, usually constructed of a material having a hardness greater than that of the tube 22, and the ferrule includes a front portion 32 and a rear portion 34. Internally, the ferrule 26 is provided with a bore 36 having a diameter slightly greater than the diameter of the tube 22. Externally, the ferrule 26 is provided with an annular tapered outer surface 38 extending from a largest diameter adjacent the rear portion 34 to a smallest diameter adjacent the front portion 32, and a convex abutment surface 40 is defined at the terminal rear of the ferrule adapted to engage the nut 30 as later described in detail. Orientation means are preferably formed on the exterior of the ferrule as described below.

The sleeve 28, like the ferrule 26, is usually constructed of a material having a hardness greater than that of the tube 22. The forward end of the sleeve is provided with a flat sealing face 42 located within a plane perpendicular to the sleeve axis and adapted to align with the fitting flat end 14 and engage the "O" ring 18 to establish a fluid tight seal therebetween. The rearward end of the sleeve is provided with an internal annular tapered cam surface 44 adapted to overlie and engage the surface 38 of the ferrule 26, and the sleeve outer surface 45 is conical and converges toward the sleeve free end. The rearward end of the sleeve is unsupported and comprises a cantilever for imposing a biasing force on the ferrule as later described. The sleeve 28 is also provided with an internal circumferential undercut 46 adapted to closely receive the end of the tube 22. The undercut 46 provides a forwardly outwardly extending conical surface which flares the end of the tube 24 outwardly and establishes a mechanical lock between the sleeve and tube and supports the tube end.

As will be apparent from FIGS. 2, 4, 8 and 9 the angle of the ferrule conical surface 38 with respect to its axis is several degrees less than the angle of the sleeve conical surface 44.

The nut 30 is internally threaded at 48 for threadedly mounting the nut to the fitting threads 20, and the nut is provided with a maximum diameter bore indicated at 50 of a sufficient dimension to receive the tube 22 and surround the ferrule 26 and sleeve 28. The nut 30 is also provided with a radially inwardly extending shoulder 52 defining an annular conical cam surface 54 adapted to engage the ferrule surface 40, and the inner diameter of the shoulder, as indicated at 56, is slightly greater than the diameter of the tube 22. The diameters of the ferrule at 36, the nut at 56 and the cylindrical sleeve surface intersected by surface 44 are the same. Externally, the nut 30 includes wrench engaging flats, not shown, whereon a wrench, or the like, may be applied for threading the nut on the fitting threads 20.

In assembly, the nut 30 is first inserted over the end of the tube 22, and the ferrule is slipped upon the end of the tube such that the ferrule's surface 40 opposes the nut's cam surface 54. Thereupon, the sleeve 28 is placed over the forward end of the tube 22 until the end is aligned with the undercut 46, and the nut 30 is preliminarily threaded upon the fitting body threads 20, as represented in FIG. 1.

Proper assembly of the connector is accomplished by a predetermined number of revolutions of the compression nut 30 and as the nut 30 is tightened, translating the nut to the right of FIGS. 1–3, the nut cam surface 54 engages the ferrule surface 40 thereby forcing the ferrule axially forwardly causing the ferrule abutment surface 38 to engage the sleeve cam surface 44. As the ferrule 26 moves forwardly, the front portion 32 of the ferrule 26 begins to deform inwardly into the tube 22 due to the configuration of the engaging surfaces and thereby force the tube and sleeve 28 forwardly engaging the sleeve sealing face 42 in a sealing relationship with the fitting body sealing face 14 and "O" ring 18, FIG. 2. Continued tightening of the nut 30 forces the ferrule 26 further forwardly deforming the front portion 32 of the ferrule 26 inwardly into a wedge type metal-to-metal sealing engagement with the tube 22, forming the primary seal between the tube and connector, and jamming the forward end of the tube into tight engagement with the undercut 46 and the annular recess defined by the undercut. The rear portion 34 of the ferrule 26 is also deformed inwardly into the tube 22 due to the configuration of the ferrule abutment surface 40, as later described, to cause the ferrule to bow, FIG. 3, and thereby provide assistance in vibration dampening. Tightening of the nut 30 will be discontinued upon the predetermined number of nut rotations occurring, and at this point a fluid tight assembly is established.

Figure 5:
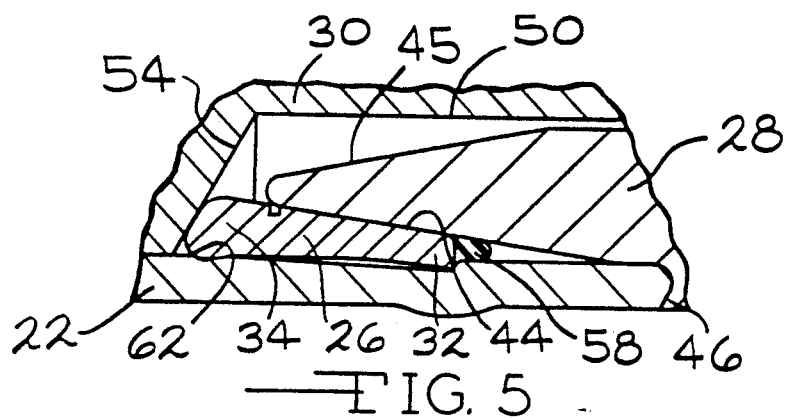
FIG. 5 is an enlarged sectional detail view of the sleeve end, ferrule and nut cam surface illustrating the relationship of FIG. 3 wherein the ferrule is fully compressed, the optional sealing ring also being illustrated in a compressed condition.

Depending on the hardness and wall thickness of the tubing material with which the tube 22 is formed, the end of the tube 22 will be flared outwardly by the undercut 46 while the wedge type engagement of the ferrule 26 with the tube will deform the tube inwardly as illustrated in FIGS. 3 and 5. This flaring and deforming of the tube provides strong resistance to axial forces imposed on the tube tending to separate the tube 22 from the fitting body 10. However, even if only slight deformation or flaring occurs, such as when connecting tubes of relatively hard materials like stainless steel, the ferrule 26 still provides significant frictional forces on the tube 22 due to the wedge type engagement to maintain the tube connected to the fitting body 10, and even if the tube is of a nonuniform surface, effective sealing will still be established to provide a fluid tight assembly.

Several advantages are derived from the tight jamming of the end of the tube 22 into the undercut 46. First, even though the end of the tube may not be exactly square a fluid-tight seal is usually achieved, however, primary sealing occurs between the tube and ferrule. Secondly, a mechanical locking of the sleeve 28 on the tube end occurs which assures that the sleeve will remain on the tube when the connector is uncoupled. Thirdly, the undercut 46 will support the tube end 24 against radial collapse during tightening of the nut and compression of the ferrule 26 as shown in FIGS. 3 and 5 as the undercut surface innermost portion extends back toward the tube 22.

Sealing is also optionally augmented by installing an O-ring 58 within the sleeve, as shown in FIGS. 4 and 5, prior to the ferrule entering the sleeve, and upon the connection being completed the O-ring 58 will deform and extrude to tightly seal the tube, ferrule and sleeve relative to each other adjacent ferrule end 32, FIG. 5.

Figure 6:
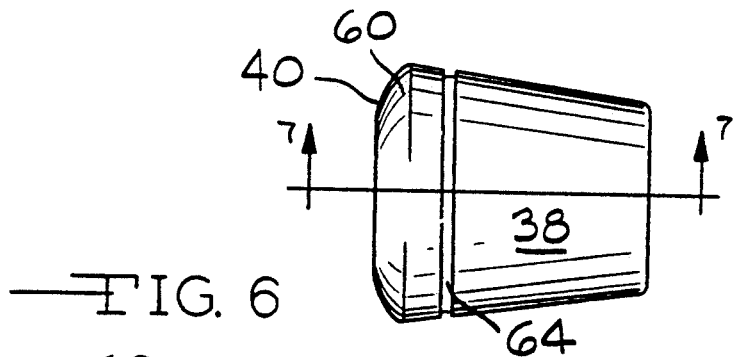
FIG. 6 is an enlarged elevational view of a ferrule having an orientation groove defined therein.
Figure 7:
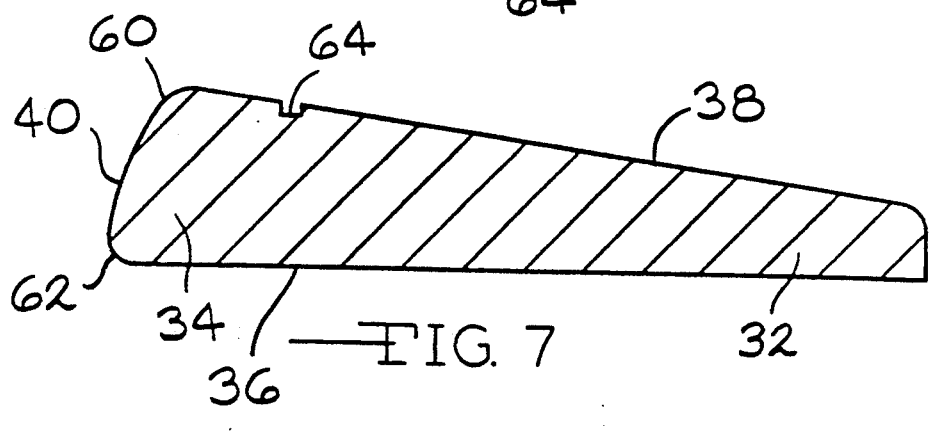
FIG. 7 is a half sectional view of the ferrule of FIG. 6 taken along section 7—7 of FIG. 6, and FIGS. 8-12 are enlarged, schematic line views of the sleeve end, ferrule and nut cam surface illustrating the relationship of these components during various stages of the assembly.

In FIGS. 6 and 7 the preferred ferrule construction is shown in detail. A groove 64 encircles the ferrule adjacent the larger diameter end 34 so that the assembler may be able to quickly determine which end of the ferrule should be first inserted over the tube end. The indicia groove 64 is particularly of advantage with small size connectors wherein the ferrule will be relatively small and the larger and smaller diameter ends are difficult to differentiate without the presence of the orientation groove 64.

The outer end 40 of the ferrule 26 consists of an outer gradual radius 60 and a smaller inner radius 62. As the nut cam surface 54 is conical a "line" contact exists between the surfaces 60 and 54 which reduces friction between these engaged surfaces reducing the torque necessary to rotate nut 30 and preventing rotation of the ferrule as the nut rotates. The radius 62 eliminates stress points in the tube as the ferrule end 34 is pushed into the tube.

To best understand the interrelationship of the tube 22, sleeve 28, ferrule 26 and compression nut surface 54 during tightening of 20 the compression nut 30 reference is made to FIGS. 8–12 wherein these components are illustrated in a schematic line drawing manner for purpose of illustration.

Figure 8:
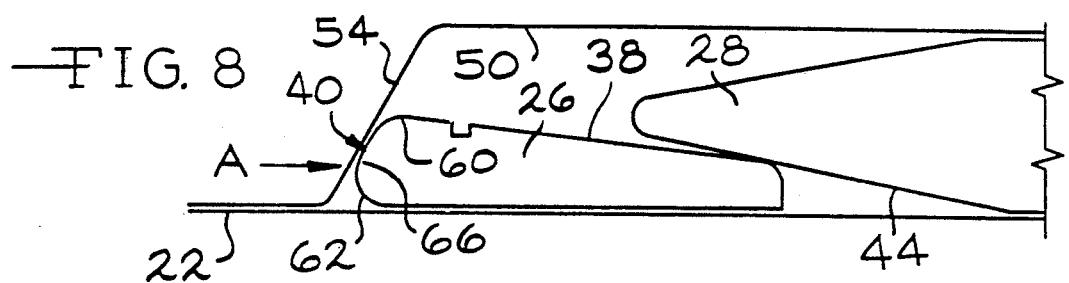
FIG. 8 illustrating the components at one-half of a revolution of the compression nut prior to a "hand tight" nut rotation.

In FIG. 8 the relationship of components is that which exists when the compression nut 30 is one-half of a revolution prior to a "hand tight" condition. In this situation the nut surface 54 will be engaging the abutment end 40 of ferrule 26 and the nose of the ferrule will have initially engaged the sleeve surface 44. As the ferrule surface 66 is only slightly convex and substantially parallel to the nut surface 54 the force being applied to the ferrule 26 is in the axial direction as indicated by arrow A, and sufficient force has not been exerted on the ferrule by the nut to deform the ferrule.

Figure 9:
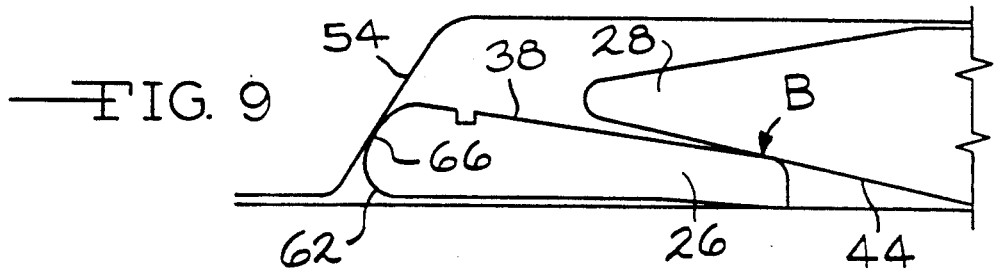
FIG. 9 illustrates the components at a "hand tight" nut position.

FIG. 9 illustrates the "hand tight" relationship wherein the nut 30 has been tightened by hand and the movement of the ferrule is substantially axial to the right as the surface 54 will be engaging the ferrule surface 66. The nose of the ferrule engages the sleeve surface 44 and a substantially radial force inwardly is imposed on the nose of the ferrule by the sleeve surface 44 as indicated by arrow B. As it will be appreciated from FIG. 9 the force B deforms the nose of the ferrule into engagement with the tube surface.

Figure 10:
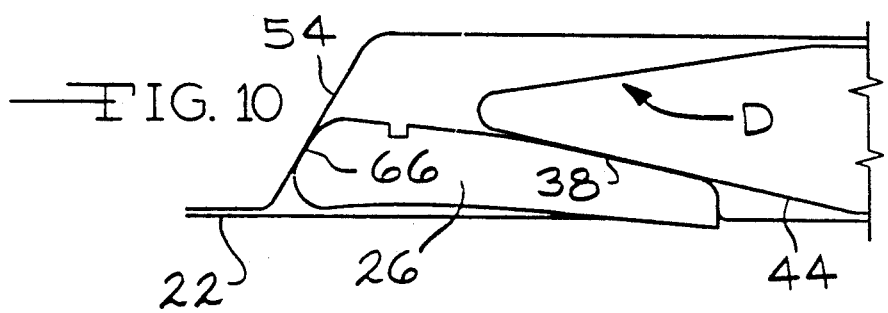
FIG. 10 shows the components one-half of a nut revolution beyond that shown in FIG. 9.

FIG. 10 illustrates the relationship of the components approximately one-half of a nut revolution past the "hand tight" relationship of FIG. 9 in the nut tightening direction. Under these conditions the force B has inwardly deformed the nose of the ferrule into the material of the tube, and the ferrule has moved to the right to such an extent that the sleeve surface 44 and the ferrule surface 38 are now substantially parallel and contiguous throughout their engagement. The nose region of the ferrule has been forced inwardly into a deeper penetration of the tube and the primary metal-to-metal sealing relationship between the ferrule and the tube is now occurring.

Figure 11:
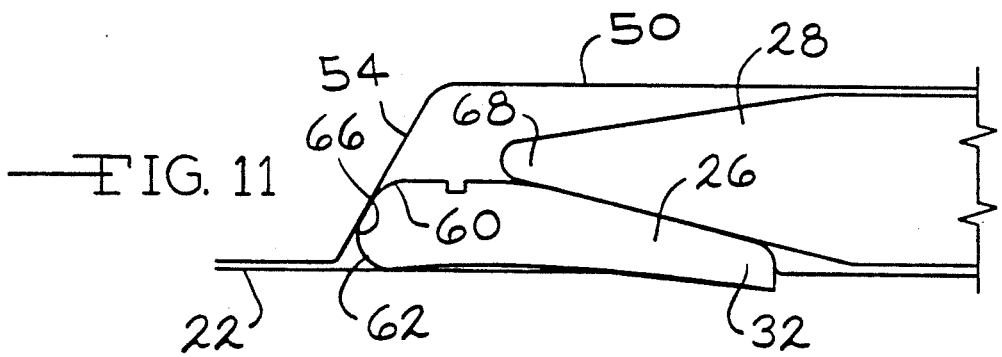
FIG. 11 represents the components one full nut revolution past the "hand tight" relationship of FIG. 9.

In FIG. 11 the components are illustrated under that condition wherein the compression nut has been rotated one full revolution past the "hand tight" condition of FIG. 9. The nose region 32 of the ferrule is imbedded deeper into the tube in view of the inward force imposed upon the ferrule by the sleeve surface 44, and the ferrule is beginning to assume a "bowed" configuration due to the high axial forces being imposed thereon. The nut cam surface 54 is now beginning to engage the ferrule convex radius 60, and the force vector between the surfaces 54 and 60 now has a radial component which causes the ferrule radius 62 to engage the surface of the tube 22 as will be appreciated from FIG. 11.

Figure 12:
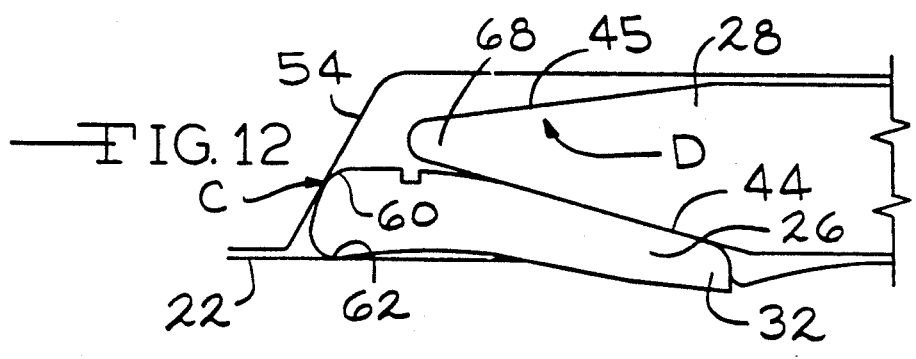
FIG. 12 illustrates the configuration of the components one and one-half revolutions past the "hand tight" relationship shown in FIG. 9.

In FIG. 12 a full tight condition is shown wherein the nut has been rotated approximately one and one-half revolutions past the "hand tight" condition of FIG. 9. Under these conditions the axial forces on the ferrule are high, the ferrule nose has been imbedded deeply into the tube 22 to achieve effective sealing, and the ferrule 26 has been significantly bowed wherein the nut surface 54 engages the ferrule radius 60 such that the force vector as represented by arrow C will have a significant radial component. This radial compression of the outer end of the ferrule engaged by the surface 54 causes the outer end of the ferrule to slightly imbed into the tube 22 at the surface 62 and a firm mechanical interconnection between the ferrule and the tube will occur at the surface 62. The firm mechanical connection of the ferrule to the tube at surface 62 provides a strong support of the tube relative to the connector at a location significantly axially spaced from the primary metal-to-metal seal occurring at the ferrule nose region 32. Thus, flexing and vibration occurring in the tube is absorbed at the ferrule radius 62 and not transmitted to the nose end of the ferrule where sealing is occurring. Accordingly, a connector utilizing the inventive concepts is able to withstand significant vibration without leakage.

Additionally, the bowed configuration of the ferrule 26 as is apparent from FIG. 12 permits the connector to absorb vibration without a loss of sealing efficiency in that the bowed configuration has an inherent resiliency. This aspect of the invention is augmented by the centilevered construction of the sleeve wherein the sleeve outer end 68 is capable of deforming outwardly in a resilient manner due to the forces being imposed on the ferrule by the sleeve. This outward deformation is represented in FIGS. 10 and 12 by the arrow D. The inherent resiliency of the cantilevered end of the sleeve will maintain a strong biasing force on the ferrule in an inward radial direction further resisting any tendency for the connector to leak even though vibrations may be imposed thereon.

The presence of the sleeve tapered outer surface 45 permits the cantilevered outer sleeve end 68 to deflect outwardly during ferrule compression without engaging the nut bore 50 and the reduced wall thickness of the outer end of the sleeve 28 resulting from surfaces 44 and 45 permits the sleeve to deflect outwardly during compression of the ferrule for maintaining the biasing compression force on the ferrule described above.

It is to be appreciated that various modifications to the inventive concepts may be apparent to those skilled in the art without departing from the spirit and scope of the invention

We claim:

1. A connector for attaching a cylindrical flareless tube having an end and an end region to a tubular fitting having an axis, an externally threaded portion and a sealing face comprising, in combination, a sleeve having an axis adapted to be placed over the end region of the tube, said sleeve including a free rearward facing end and a forward facing end defining a sealing face and adapted to be located in an opposed axially aligned relationship to the fitting sealing face, said sleeve including an interior conical surface converging in the direction of said sleeve forward facing end, said sleeve including an outer conical surface converging in the direction of said sleeve rearward facing end intersecting said sleeve rearward facing end wherein the radial wall thickness of said sleeve adjacent said rearward facing end is less than the sleeve wall thickness adjacent said sleeve forward facing end, a ferrule having a front portion, a rear portion having an external abutment surface, an internal diameter substantially equal to the diameter of the tube, and an external conical surface adapted to engage said sleeve inner conical surface for deforming said ferrule front portion inwardly into a metal-to-metal sealing engagement with the tube's cylindrical surface, a nut surrounding said sleeve and said ferrule having threads adapted to engage the fitting threaded portion, said nut having an internal shoulder adapted to engage said ferrule's abutment surface forcing said ferrule forwardly engaging said ferrule exterior conical surface and sleeve conical surface to radially contract said ferrule, the angle of convergence of said sleeve inner conical surface being greater than the angle of convergence of said ferrule external conical surface whereby axial compression of said ferrule during tightening of said nut causes said ferrule to axially bow radially outwardly between said ferrule front and rear portions, said sleeve inner conical surface and said ferrule exterior conical surface engaging adjacent said sleeve rearward facing end upon completion of tightening of said nut wherein said reduced wall thickness of said sleeve adjacent said sleeve rearward facing end permits said sleeve rearward facing end to deflect radially outwardly imposing an inwardly directed biasing force upon said ferrule, completion of the nut tightening engaging the fitting sealing face with the sleeve forward facing sealing face establishing sealing between the fitting and said sleeve.

2. In a connector as in claim 1, the fitting sealing face being flat and substantially perpendicular to the fitting axis, said sleeve forward facing end comprising a flat sealing face within a plane substantially perpendicular to the sleeve axis, an annular recess defined within and intersecting the fitting sealing face, and an elastomeric seal located within said annular recess adapted to establish a sealing relationship with said flat sleeve face.

3. A connector for attaching a cylindrical flareless tube having an end and an end region to a tubular fitting having an axis, an externally threaded portion and a sealing face comprising, in combination, a sleeve having an axis adapted to be placed over the end region of the tube, said sleeve including a rearward facing end and a forward facing end defining a sealing face adapted to be located in an opposed axially aligned relationship to the fitting sealing face, said sleeve including an inner conical surface intersecting said rearward facing end converging in the direction of said sleeve forward facing end, a ferrule having a front portion, a rear portion having an external abutment surface, an internal diameter substantially equal to the diameter of the tube, and an external conical surface adapted to engage said sleeve inner conical surface for deforming said ferrule front portion inwardly into a metal-to-metal sealing engagement with the tube's cylindrical surface, said ferrule external abutment surface comprising a convex surface having a first radius and a convex second radius of lesser dimension than said first radius defining an abutment surface outer dimension, a nut surrounding said sleeve and said ferrule having threads adapted to engage the fitting threaded portion, said nut having an internal shoulder having a conical surface converging toward the tube and away from said ferrule whereby upon tightening of said nut said nut conical surface engages said ferrule first convex surface in an annular line forcing said ferrule forwardly into engagement with said sleeve inner conical surface to radially compress said ferrule, said ferrule being formed of an elastically deformable metal and bowed radially outwardly between said ferrule front and rear portions when under axial compression to produce a spring force within said ferrule to reduce vibration loads within said connector, said ferrule second convex abutment surface defining said abutment surface outer dimension engaging said nut conical surface upon said ferrule bowing to produce a radially inward force vector forcing said ferrule rear portion into said tube, tightening of said nut axially forcing said ferrule and sleeve and sleeve forward facing sealing face into a sealing relationship with the fitting sealing face.

4. In a connector for a cylindrical flareless tube as in claim 3, indicia means defined on said ferrule external conical surface adjacent one of said ferrule portions to visually indicate a predetermined ferrule end portion.

5. A connector for a flareless tube as in claim 4, said indicia means comprising an annular groove circumscribing said ferrule exterior conical surface.

6. In a connector for a cylindrical flareless tube as in claim 3, the angle of convergence of said sleeve inner conical surface being greater than the angle of convergence of said ferrule external conical surface whereby axial compression of said ferrule during tightening of said nut causes said ferrule to axially bow radially outwardly between said ferrule front and rear portions.

7. The method of attaching a flareless tube end region having an axis and cylindrical inner and outer axially spaced portions to a fitting having an annular sleeve circumscribing the tube inner portion, the sleeve including an inwardly facing conical surface radially spaced from the tube inner portion and axially converging at a first angle in a direction away from the tube outer portion, the fitting including a compression nut having an annular conical abutment surface circumscribing the tube outer portion converging away from the tube inner portion and adapted to be axially displaced toward the sleeve upon compression nut rotation, an annular ferrule circumscribing the tube outer portion having an exterior conical surface converging at a second angle toward the sleeve, the ferrule including a front portion received within and engaging the sleeve conical surface and a rear portion engaged by the nut abutment surface, the ferrule rear portion including a radially inwardly first convex arcuate surface and a second radially outward convex arcuate of lesser radius than that of the first convex surface adapted to be sequentially engaged by the nut abutment surface at a contact line, the first converging angle of the sleeve conical surface being greater than the second converging angle of the ferrule conical surface, comprising the steps of:
  (a) axially displacing the compression nut abutment surface toward the sleeve to engage the nut abutment surface with the ferrule first arcuate surface and axially displacing the ferrule front portion into engagement with the sleeve conical surface,
  (b) continue axial displacement of the compression nut abutment surface toward the sleeve whereby sufficient axial length engagement of the sleeve conical surface and the ferrule conical surface occurs to cause the ferrule front portion to imbed into the tube inner portion and the ferrule to outwardly bow intermediate its front and rear portions due to the difference in the values of the first and second convergent angles, and
  (c) continue axial displacement of the compression nut abutment surface toward the sleeve to continue outward bowing of the ferrule until the nut abutment surface engages the ferrule second convex outer surface producing an increased inward radial force on the ferrule rear portion causing the ferrule rear portion to tightly engage and support the tube outer portion.

8. The method of attaching a flareless tube end region as in claim 7 including the step of:
  (a) radially inwardly biasing the sleeve upon the ferrule to provide resistance to inadvertent displacement due to vibration.

9. The method of compressing an annular ferrule upon a flareless tube having an axis and axially spaced inner and outer portions wherein the ferrule includes an axis, a bore receiving the tube, a front portion, a rear portion, and an exterior surface converging in the axial direction from the rear portion toward the front portion comprising the steps of:
  (a) during the initial stage of ferrule compression primarily displacing the ferrule in an axial direction toward the ferrule front portion while inwardly compressing the ferrule front portion to cause the ferrule front portion to imbed into the tube inner portion,
  (b) engaging the ferrule exterior surface intermediate the front and rear portions to cause the ferrule to outwardly bow to further imbed the ferrule front portion into the tube inner portion and to modify the ferrule rear portion relationship to the tube outer portion, and
  (c) during the final stage of ferrule compression primarily displacing the ferrule rear portion radially inwardly by changing the direction of compression forces on the ferrule rear portion to be increasingly in a radial direction to firmly engage the ferrule rear portion with the tube outer portion.

* * * * *